(No Model.)   7 Sheets—Sheet 3.

W. T. McRAE.
AUTOMATIC BOX MAKING MACHINE.

No. 585,887.   Patented July 6, 1897.

Fig. 3.

Witnesses
E. C. Wiedeman
S. S. Williamson

Inventor
William T. McRae
by Geo. H. Holgate
Attorney (No Model.) 7 Sheets—Sheet 4.

W. T. McRAE.
AUTOMATIC BOX MAKING MACHINE

No. 585,887. Patented July 6, 1897.

Witnesses
E. C. Wurdeman
S. S. Williamson

Inventor
William T. McRae
by Geo. H. Holgate
Attorney

THE NORRIS PETERS CO., PHOTO-LITHO., WASHINGTON, D. C.

(No Model.)　　　　　　　　　　　　　　　　　7 Sheets—Sheet 5.
W. T. McRAE.
AUTOMATIC BOX MAKING MACHINE.
No. 585,887.　　　　　　　　　　Patented July 6, 1897.

Witnesses
E. C. Wurdeman
S. J. Williamson

Inventor
William T. McRae
by Geo. H. Holgate
Attorney (No Model.) 7 Sheets—Sheet 6.
W. T. McRAE.
AUTOMATIC BOX MAKING MACHINE.
No. 585,887. Patented July 6, 1897.

Witnesses
E. C. Wurdeman
A. J. Williamson

Inventor
William T. McRae
by Geo. H. Holgate
Attorney (No Model.)  W. T. McRAE.  7 Sheets—Sheet 7.
AUTOMATIC BOX MAKING MACHINE.

No. 585,887.  Patented July 6, 1897.

Witnesses:
J. B. McGirr.
R. S. C. Caldwell

Inventor.
William T. McRae.
by Geo. H. Holgate
Attorney.

UNITED STATES PATENT OFFICE.

WILLIAM T. McRAE, OF PHILADELPHIA, PENNSYLVANIA, ASSIGNOR OF ONE-HALF TO JOS. J. MACAULAY, OF SAME PLACE.

AUTOMATIC BOX-MAKING MACHINE.

SPECIFICATION forming part of Letters Patent No. 585,887, dated July 6, 1897.

Application filed January 2, 1896. Serial No. 574,122. (No model.)

*To all whom it may concern:*

Be it known that I, WILLIAM T. MCRAE, a citizen of the United States, residing at Philadelphia, in the county of Philadelphia and State of Pennsylvania, have invented certain new and useful Improvements in Automatic Box-Making Machines, of which the following is a specification.

My invention relates to a new and useful improvement in box-making machines, and has for its object to produce a machine of this description which will automatically feed the shooks from which a box is to be made into position, drive all the nails necessary to complete said box, and finally to convey said box from the machine.

With these ends in view the invention consists in the details of construction and combination of elements hereinafter set forth and then specifically designated by the claims.

In order that those skilled in the art to which the invention appertains may understand how to make and use the same, I will describe its construction and operation in detail, referring by numbers to the accompanying drawings, forming a part of this specification, and in which—

Fig. 13, a perspective of one of the hammers and holder for same; Fig. 14, a perspective of the upper end of one of the nail-chutes; Fig. 15, a sectional elevation of the lower end of one of the chutes, and Fig. 16 a section at the line $v\ v$ of Fig. 15.

Similar numbers denote like parts in the views of the drawings.

1 is the frame of the machine, made in such shape as to conveniently support the operating parts thereof, and in turn supported by suitable legs 2.

3 is a double standard which projects upward from the bed-plate of the machine, and is so arranged as to form a guide for the box 4, which is adjustably secured therein by the threaded rod 5, which passes through the nut 6, and is adapted to be operated by the hand-wheel 7. The box 4 is provided with an extension 8, which is preferably square in cross-section, and adapted to support the hub 9, which is provided with a central opening to fit upon the end of this extension, and is secured in place thereon by means of any suitable set-screw.

Figure 11:
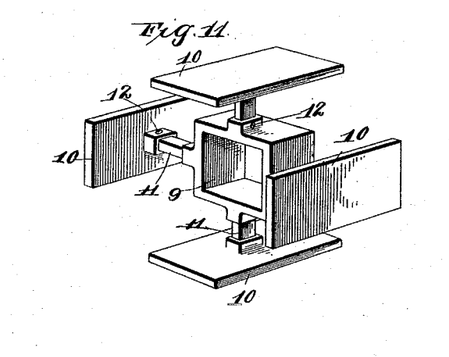
Fig. 11, a similar view of the gage-plates and holder.
Figure 12:
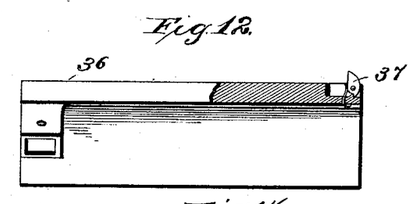
Fig. 12, an elevation of one of the members of the feed-plunger, a portion being in section, so as to show more clearly the feed-dog.

10 are gage-plates, supported by the shanks 11, which fit into suitable bearings in the hub and are made adjustable by means of suitable screws 12. By reference to Fig. 11 it will be seen that this arrangement of the gage-plates upon the hub produces a four-sided block, the use of which will be hereinafter set forth.

Figure 1:
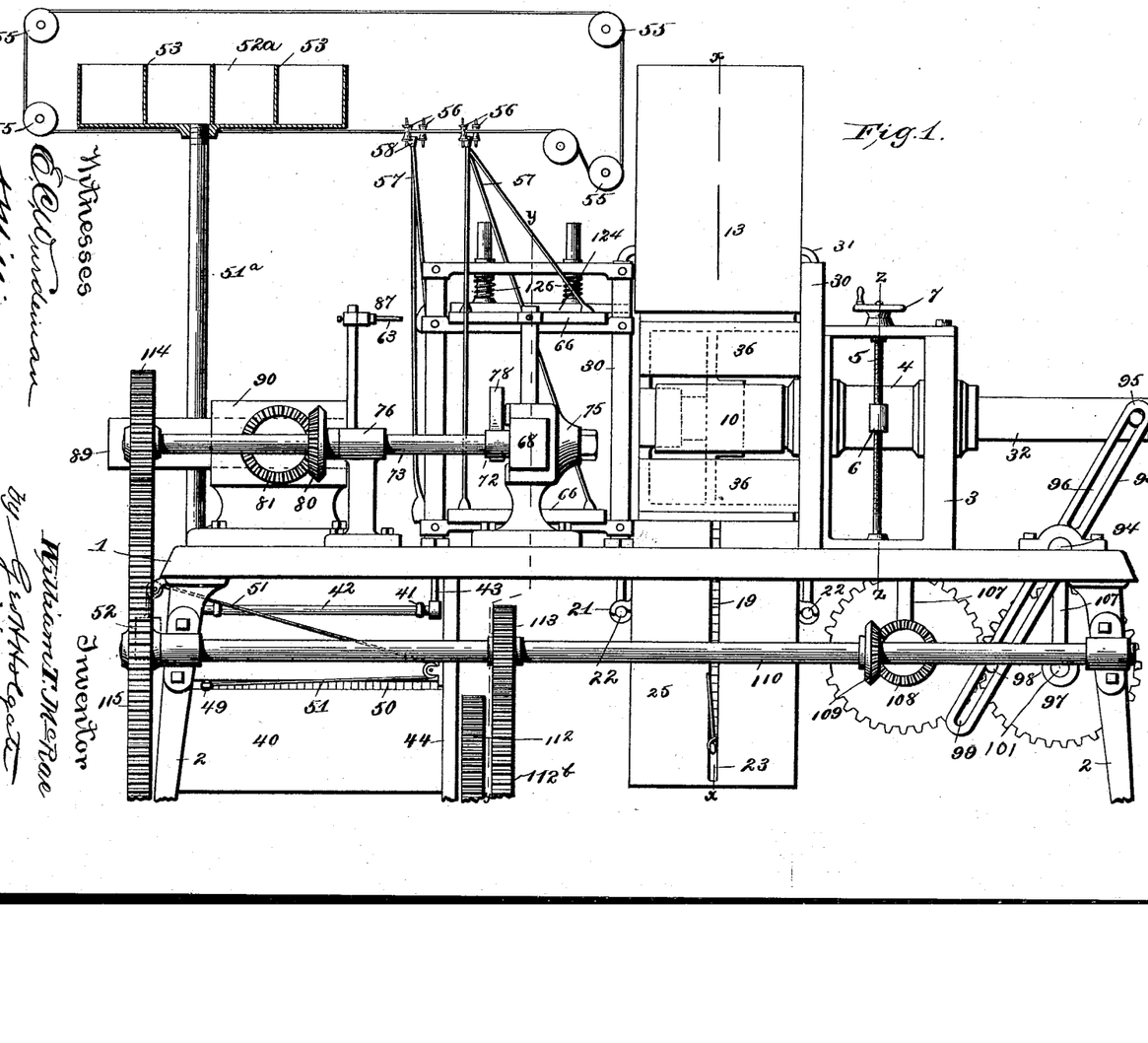
Figure 1 is a side elevation of my improved machine.
Figure 2:
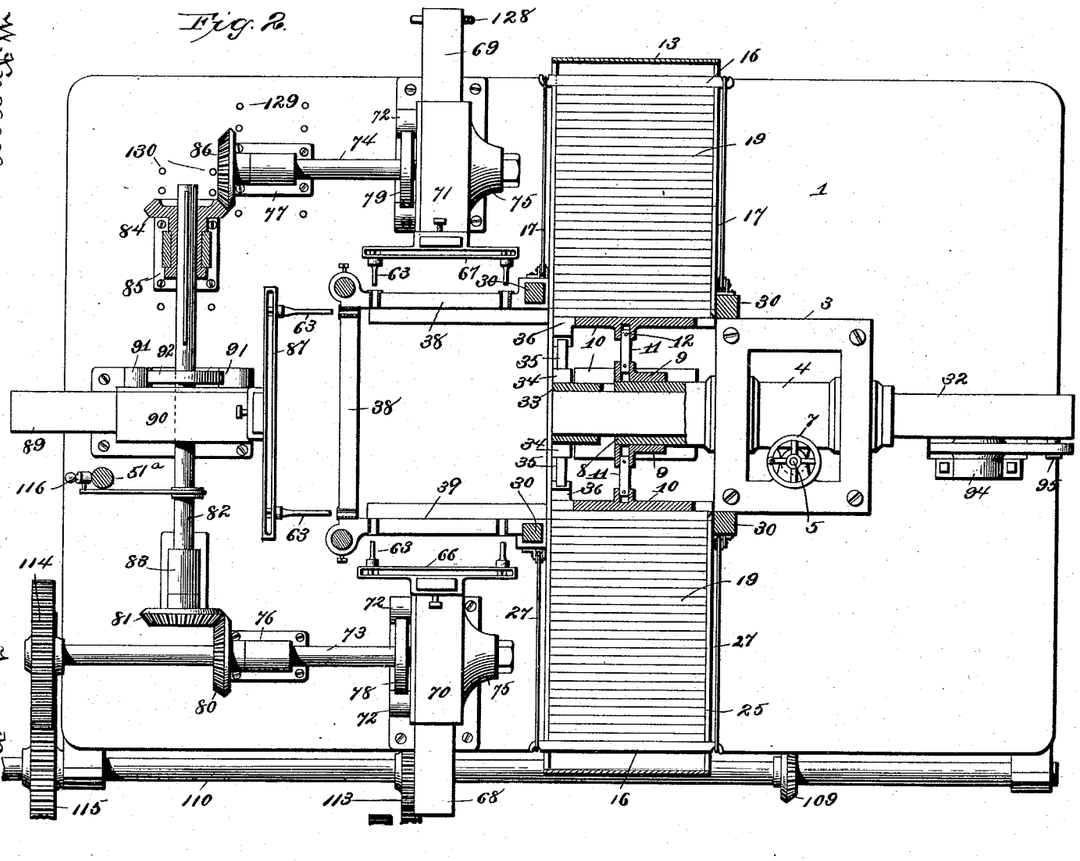
Fig. 2, a plan view of the same, certain details being in section so as to more clearly show the operations thereof.
Figure 3:
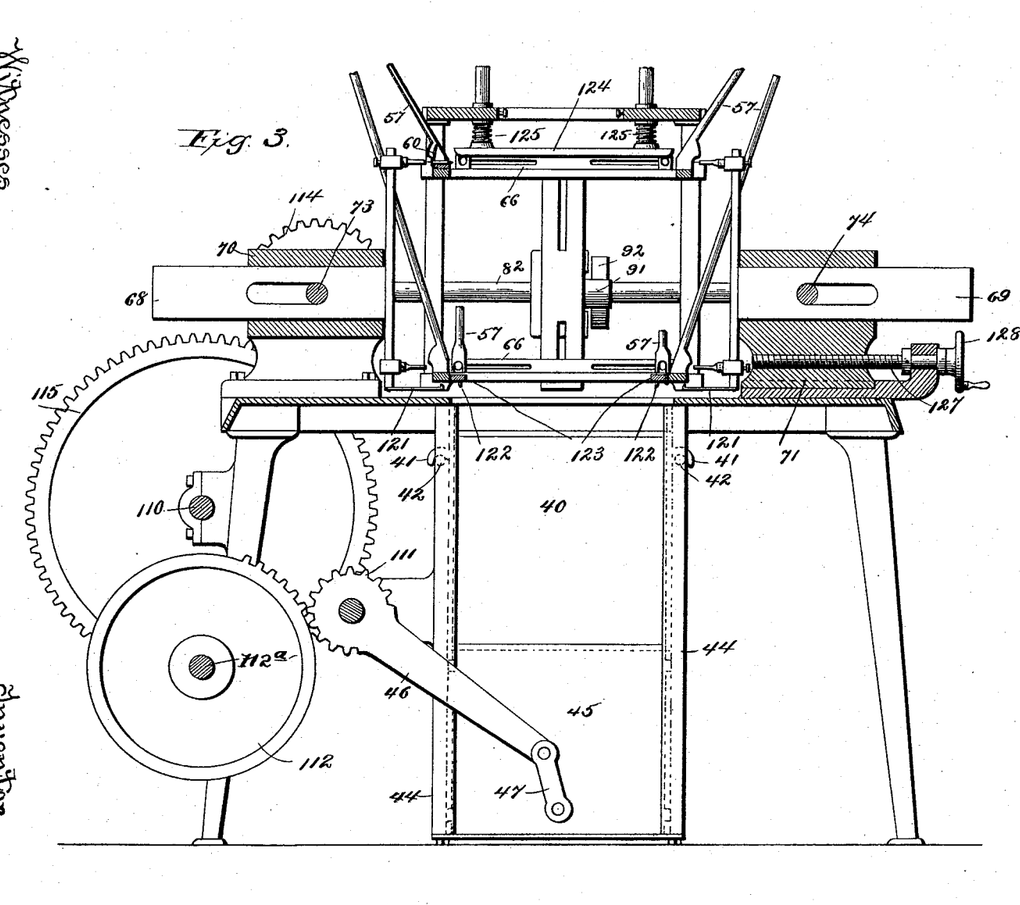
Fig. 3, a section at the line $y\ y$ of Fig. 1.
Figure 4:
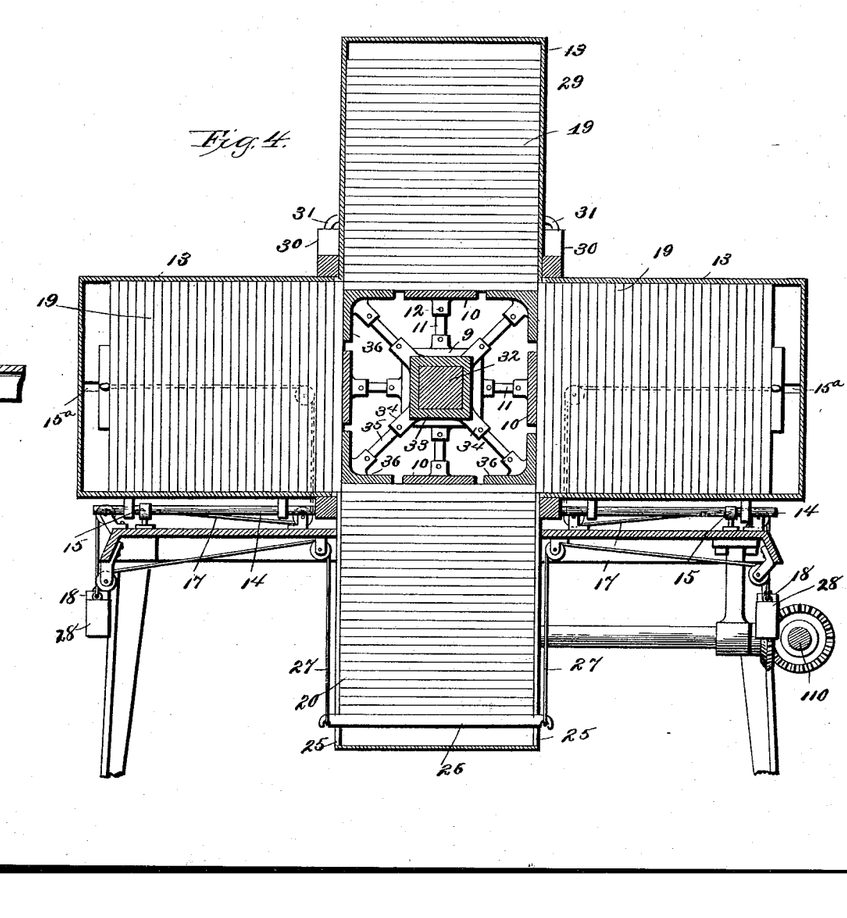
Fig. 4, a section at the line $x\ x$ of Fig. 1.
Figure 5:
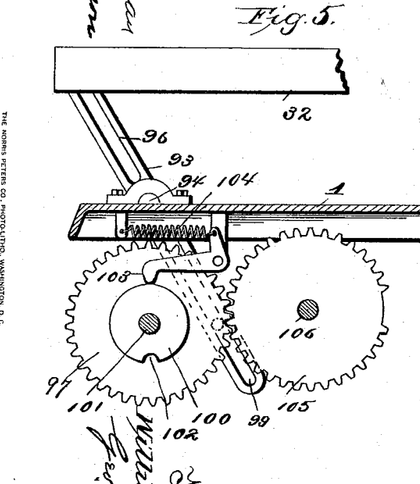
Fig. 5, an enlarged detail of the actuating mechanism for imparting motion to the feed-plunger.

13 are two feed-boxes arranged upon either side of the gage-plates, as shown in Figs. 2 and 4, and supported by the rods 14, which are held in the bearings 15, projecting from the bed-plate of the machine. Each of these boxes is provided with slots $15^a$ upon their sides, which guide the push-bars 16, and these bars are given a tendency to move forward by the cords 17 and weights 18 suspended thereon. These cords 17 pass over suitable guide-pulleys and are attached to the push-bars, so as to be readily detached therefrom.

The feed-boxes are adapted to receive the shooks 19, which have been previously sawed to size, and as the push-bars bear upon these shooks with a tendency to push them forward it will be seen that the inner shook in each box will be pressed firmly against one of the gage-plates.

20 is a feed-box similar to the ones just described, having lugs 21 projecting from its sides adapted to rest upon the rods 22, so as to support said feed-box, and 23 are slots in the sides of this box, in which the push-bar 26 is guided. 27 are ropes connected to this bar, leading over suitable guide-pulleys and supporting weights 28, by means of which the bar 26 is given an upward tendency sufficient to lift the shooks 19, causing the upper one thereof to bear firmly against one of the gage-plates.

29 is another feed-box supported upon the standards 30 by the lugs 31, which project therefrom, and the shooks in this box fall by gravity, so that the lower shook bears firmly against one of the gage-plates, so that it will be seen that the four shooks which are to compose the sides of the box each bears against its respective gage-plate and is held in proper relative position.

Figure 10:
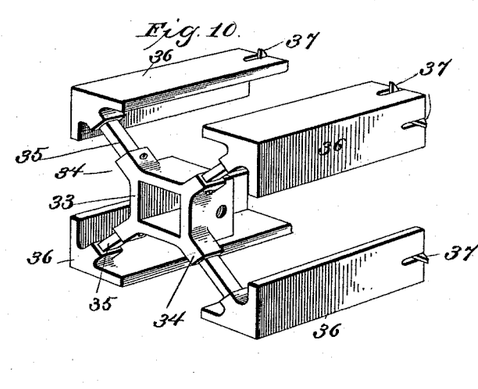
Fig. 10, a perspective of the feed-plunger.

32 is a plunger-bar, preferably square in cross-section, which passes through a suitable opening in the box 4 and is guided longitudinally thereby. Upon the inner end of this bar is secured, by means of suitable set-screws, the hub 33, provided with four radial sockets 34, in which fit the arms 35, which in turn support the angle-plates 36, as clearly shown in Fig. 10. These plates are adjusted upon their respective arms, so as to occupy the space intervening between the gage-plates, thus forming corners for a square, the sides of which are formed by said gage-plates.

Pivoted in the rear ends of the angle-plates are spring-actuated feed-dogs 37, one of which projects above each of the faces of said angle-plates, and these dogs are held in their normal distended position by any suitable springs. Thus when motion is imparted to the plunger composed of these plates the dogs, which run back clear of the shooks, will spring outward and upon the forward movement of the plunger engage the edges of the four shooks bearing against the gage-plates and force them forward into the square frame composed of the sides 38 and 39. Here the plunger is permitted to remain by suitable dwell mechanism, to be hereinafter explained, until the hammers are brought into action to drive home the nails.

40 is a feed-box supported by the lugs 41, which project from its sides and rest upon the rods 42, which are supported by suitable brackets 43, depending from the bed-plate. The open end of this feed-box is arranged in juxtaposition to the guideways 44, in which slides vertically the plunger 45, to which motion is imparted by the reciprocating arm 46, connected by link 47 with said plunger.

A push-bar 49 similar to those above described is arranged to slide in the slots 50, formed in the sides of the box 40, and this bar is given a tendency to move forward by the cords 51, passing over suitable pulleys, and supporting weights 52, so that the inner shook in this box is caused to bear against the guideways in which the plunger 45 moves, and the mechanism of the machine is so timed as to cause the plunger to move this shook upward into the frame formed by the sides 38 and 39 at the same time that the shooks 19 are brought into position, and the shook fed upward by the plunger 45 forms the bottom of the box and is nailed into position by the hereinafter-described hammer mechanism at the same time that the sides of the box are nailed.

When the several shooks have been fed into their proper relative position to each other to form a box, the next step is to bring the required number of nails into position to be driven. This is accomplished by the mechanism now to be described.

Projecting upward from the bed-plate is a standard 51ª, to the top of which latter is a hopper 52ª, divided into compartments by the partitions 53 to prevent the clogging of the nails which are placed in the hopper. The bottom of the hopper is provided with longitudinal openings of considerable width, under which and in close proximity thereto are strung a number of parallel wires 54, one on either side of each opening, and these wires are supported, guided, and caused to move in the direction of the arrow by suitable rolls 55, to which motion may be imparted by any convenient mechanism, such as a belt, and the rolls in turn are supported in a suitable frame. (Not shown.)

Figure 6:
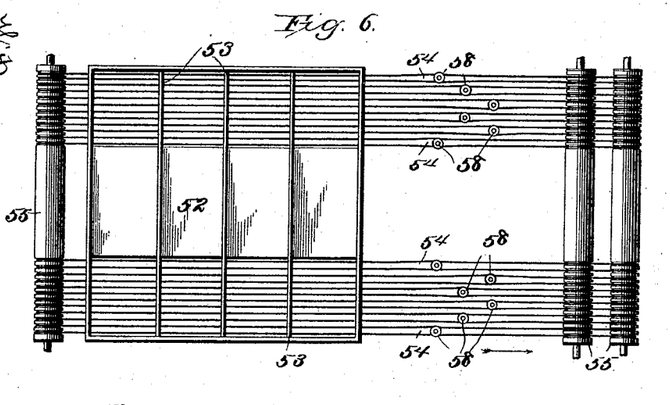
Fig. 6, a plan view of the nail-hopper and devices for feeding the nails to their respective chutes.
Figure 7:
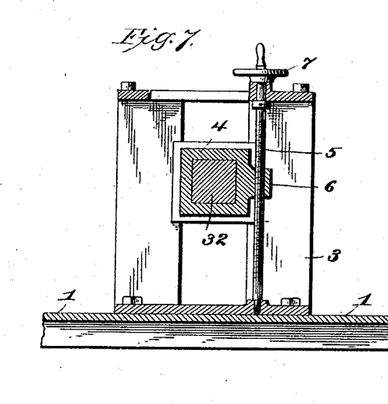
Fig. 7, a detail section at the line $z\ z$ of Fig. 1, showing the adjustment of the feed-plunger rod.
Figure 8:
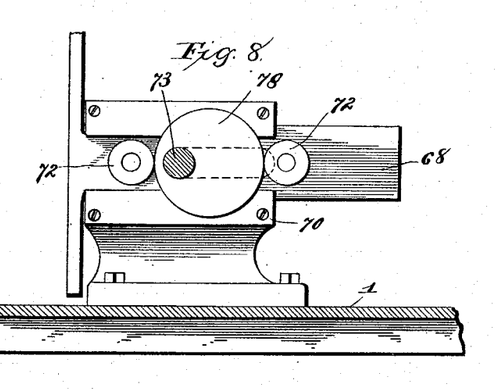
Fig. 8, an enlarged detail of the hammer-actuating mechanism.
Figure 9:
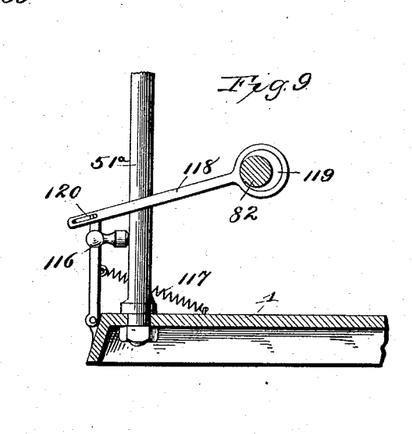
Fig. 9, a similar view of the vibrator for assisting the feeding of nails.
Figures 13, 14, 15, 16:
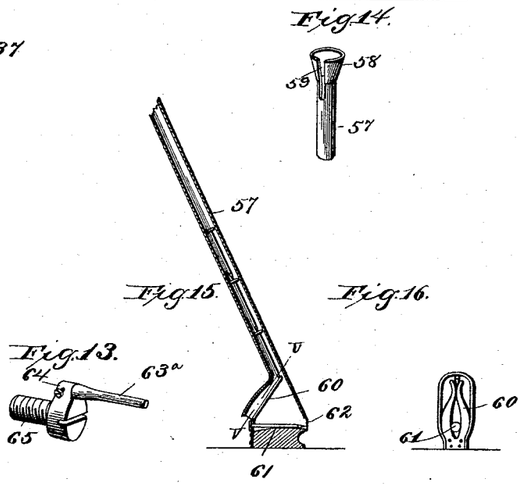
Figures 17, 18, 19:
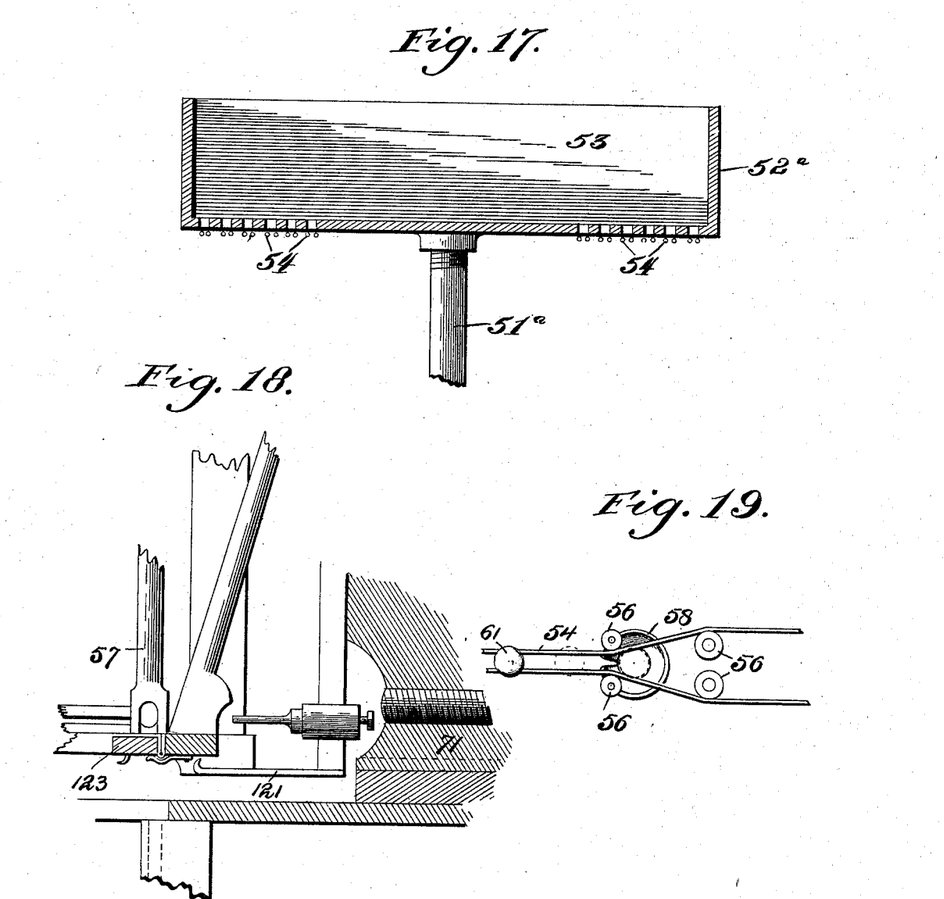
Fig. 17 is a cross-sectional view of the hopper.
Fig. 18, an enlarged detail view of the box-dropping mechanism.
Fig. 19 is a plan view of the spreader-rolls and chute.

56 are spreader-rolls located between the wires, which lead from each slot at given points, so as to press the latter apart, and 57 are chutes composed of tubes having flared mouths 58, one of which is arranged immediately in front of each of the spreader-rolls, by which arrangement when nails are placed in the hopper a number thereof will drop between the parallel wires and remain suspended from said wires by their heads, and as the wires travel in the direction of the arrow in Fig. 6 the nails will be carried thereby until passing into the mouth of the chutes through the slots 59, at which point the wires are sufficiently spread by the rolls 56 to permit the head of the nail which has passed into the mouth of the chute to drop through said wires, when it will be conveyed by the chute to the bottom thereof, which is enlarged, as clearly shown in Figs. 15 and 16, and has arranged therein a guide-spring 60 in the shape of a fork, the upper ends of the prongs thereof coming in contact with each other, so as to prevent the lowest nail in the chute from passing between these prongs until they have been forced apart by suitable mechanism to be hereinafter explained, and the upper end of the nail being permitted to pass and assume a horizontal position, as shown at 61 in Fig. 15. The space between the prongs of this fork is sufficient at the bottom thereof to permit the passage of the nail-head, and an opening 62 is formed in the chute in line with the point of the nail, so that said nail may be forced out of said chute horizontally by a suitable hammer.

It is to be noted that a chute is provided for each of the nails to be driven, and the lower end of one of said chutes is arranged in the proper position to place a nail for driving at each of the points where a nail is needed for securing the shooks in making a completed box. The nails thus placed are forced into the box by a series of hammers 63, one of which is shown in detail in Fig. 13 and consists of a plug 63ª, having an enlargement upon the rear portion thereof and adapted to be secured in the offset 64 of the bolt 65, which latter may be secured to the hammer-plates by being threaded therein or bolted thereon by suitable nuts.

66 and 67 are the hammer-plates, which carry the hammers for driving the nails into the sides of the box and are secured to the slide-bars 68 and 69, respectively, which in turn are supported and guided in the housings 70 and 71, the latter of which is adjustably bolted to the bed-plate and the former rigidly bolted thereto. An opening is left in one side of each of the housings, so as to permit the back-and-forth movement of the rolls 72, which are journaled upon suitable studs projecting from the side of the slide-bars, and a slot is formed in said slide-bars, through which pass the shafts 73 and 74, having one of their bearings in boxes 75, formed upon the sides of the housings. The shaft 73 also has a bearing in the box 76, which is rigidly secured to the bed-plate, and the shaft 74 has a bearing in the box 77, which is adjustably bolted to the bed-plate for the purpose hereinafter set forth.

78 and 79 are eccentric wheels secured upon the shafts 73 and 74, respectively, and adapted to occupy the space between the rolls 72, so as to impart reciprocating motion to the slide-bars 68 and 69 when the shafts are revolved. The shaft 73 is provided with a beveled gear 80, which meshes with a corresponding gear 81, secured upon the cross-shaft 82, which is journaled in the bearing 83 and is splined upon its opposite end to the beveled gear 84, the shank of which is journaled in the bearing 85, the latter being adjustably secured to the bed-plate.

86 is a beveled gear on shaft 74, which meshes with the gear 84, so that when the shaft 73 is revolved the shaft 74 revolves in unison therewith, which causes the slide-bars 68 and 69 and hammers carried thereby to act simultaneously.

87 is a hammer-plate secured to the slide-bar 89, which is supported and guided by the housing 90, and this slide-bar has journaled upon its side the rolls 91, which embrace the eccentric 92, secured upon the cross-shaft 82, by which means the hammer-plate 87 is reciprocated in the same manner as that described in connection with the hammer-plates 66 and 67. From this description it will be seen that the actuating mechanisms being properly timed the feed-plunger, composed of the angle-plates 36, will, upon being moved forward, carry with it the four shooks which compose the side of the box, as before described, while at the same time the plunger 45 will elevate a shook from the feed-box 40, which is to compose the bottom of the box, and the several nails having been previously fed to their proper positions the hammer-plates 66, 67, and 87 will move toward the box, causing the hammers carried thereby to engage the heads of the nails and force the same into the shooks, and as each of the hammers 63 pass between the prongs of their respective forks 60 the enlarged portion of the hammers will force said prongs sidewise, spreading their upper ends sufficiently to permit the lowest nail in each chute to drop between the prongs to a horizontal position, as before described, and when this takes place the next nail above will assume the position occupied by the last nail. The feed-plunger, composed of the angle-plates 36, serves as an anvil, against which the nailing operation takes place, and therefore must dwell in its distended position during this operation, which is accomplished by the following mechanism:

93 is a lever pivoted to the bed-plate at 94 and connected to the slide-bar 32 by a bolt 95, passing through the slot 96 in said lever, and to the crank-wheel 97 by the crank-pin 98, passing through the slot 99, so that when the wheel 97 is revolved an oscillating motion is imparted to the lever 93, which latter causes the slide-bar 32 to reciprocate.

100 is a disk secured upon the shaft 101, upon which the crank-wheel is secured and having a notch 102 cut in its periphery, with which the nose of the pivoted dog 103 is adapted to engage by the force of the springs 104. The crank-wheel 97 is provided with gear-teeth upon its periphery, with which the teeth of the gear 105 mesh. The teeth of this latter gear do not extend entirely around the periphery thereof, thus leaving a blank space of sufficient length to cause the crank-wheel 97 to dwell, as is well understood in mutilated gearing, and the notch 102 is set so that the nose of the dog 103 comes into engagement therewith when the teeth of the gear 105 pass out of mesh with the teeth of the crank-wheel, and this is so timed that the feed-plunger, actuated by this mechanism, will remain in its distended position during the operation of the hammers to drive the nails, as before described. The gear-wheel 105 is secured upon the shaft 106, which is journaled in suitable hangers 107, and has secured thereon the beveled gear 108, which meshes with a similar gear 109, secured upon the shaft 110, which latter is journaled in suitable boxes secured upon the frame of the machine.

It is necessary in timing the feeding devices that the shook which forms the bottom of the box should be fed into place simultaneously with the shook which forms the side of the box, and this is brought about by the arm 46, having formed upon its hub the segmental gear 111, which is adapted to mesh with the mutilated gear 112, secured on a short shaft 112$^a$, on which is a gear 112$^b$, adapted to mesh with the pinion 113, secured upon the power-shaft 110, and this mutilated gear is so timed as to cause the arm 46 to actuate the plunger 45 upward to a sufficient extent to carry a shook into its proper place, when the teeth of the segment will pass out of the mesh with the teeth of the gear 112, thereby permitting the plunger 45 to drop by gravity to its normal position, when, as before described, the push-bar 49 will feed another shook into place against the guideways of the plunger to be elevated at the next operation thereof.

The shaft 73 carries a gear 114 upon its outer end, which meshes with the gear 115, secured upon the power-shaft, so that when the power-shaft is set in motion the shaft 73 will be caused to revolve, from which rotation will be imparted to the shafts 82 and 74, as before described for actuating the hammers, the inward movement of which takes place immediately after the shooks have been fed into place.

After the box has been completed by the driving of the nails it is necessary to remove it from the machine, and this is accomplished by the return movement of the side hammer-plates 66 and 67, which carry springs 121, having catches upon their free ends to engage the lugs 122, which project from the under side of the hinge-strips 123. These hinge-strips are held normally in a horizontal position by springs (not shown) and serve to support the bottom shook 19 when being fed forward, but when the hammer-plates start upon their return movement the catches just described will engage the lugs 122 and swing the strips downward against the action of their springs, thus permitting the box to drop from the machine through a suitable chute, by which it may be conveyed to any desired location, it being understood that the feed-plunger, composed of the angle-plates 36, will have previously been withdrawn from the box. Upon the forward movement of the hammer-plates the springs 121 will be deflected downward when coming in contact with the lugs 122, thus passing over said lugs, so as to engage them upon the backward movement of the hammer-plates.

To facilitate the feeding of the nails between the parallel wires 54, a hammer 116 is pivoted to the bed-plate in such position as to strike against the standard 51 when swung to and fro, and the spring 117 serves to move the hammer toward the standard, and the arm 118, the strap of which embraces an eccentric 119, serves to push the hammer backward, the slot 120 permitting the arm to continue its movement after the hammer has struck the standard, which takes place during the fastest movement of said arm.

124 is a presser-bar, held down by suitable springs 125, so that when the top shook 19 is fed into place it will be firmly held by the spring action of this presser-bar.

To provide for the making of boxes of various sizes within the limits of a given-sized machine, the various parts of said machine must be capable of adjustment, and this I provide for in arranging the box 4 in guide-ways so as to have a vertical sliding movement and supporting the same by the threaded rod 5. The result of an adjustment of this box is to change the position of the plunger composed of the angle-plates 36, so as to accommodate it to a larger or smaller sized box. When this adjustment has been made, the size of the box is determined by an adjustment of the gage-plates 10, relative to their hub 9, upon the arms 11, and in order that the plunger may correspond with the gage-plates the angle-plates 36 are adjusted upon their hub 33. These adjustments of course necessitate the substitution of larger or smaller feed-boxes for holding the shooks. The hammer-plate 67 is adjusted to or from the center of the machine by the rod 127, which is threaded into the box 71, and as the latter is run in suitable guideways, which are bolted to the bed-plate, it will be seen that the revolving of this rod by the hand-wheel 128 will move the box to or fro. The adjustment of this box necessitates the moving of the box 77, which is permitted by a number of holes 129, formed in the bed-plate, and in order that the beveled gear 84 may be adjusted so as to mesh with the gear 86 when moved to or fro similar holes 130 are provided for the adjustment of the box 85. This movement of the gear 84 is permitted by its being splined to the shaft 82, as before stated.

The several feed-boxes are adapted to be placed in their proper relative positions, and removed therefrom, so as to be refilled with shooks, with as little delay as possible, and in practice I prefer to have a number of these feed-boxes which may be filled with shooks ready to be attached to the machine when those in position have become exhausted.

It is obvious that a number of modifications might be made in the exact construction and arrangement of the several parts of the machine here shown and described without departing from the spirit of my invention, which rests in the broad idea of producing a machine which will automatically feed the required shooks into position, secure the same by nails, and discharge the completed box, repeating these operations without assistance from an attendant.

Having thus fully described my invention, what I claim as new and useful is—

1. In a device of the character described, a hopper having slots in its bottom, parallel wires propelled beneath the slots in such a position as to convey nails from the hopper, spread-rolls located between the wires and chutes in front of the spread-rolls, as and for the purpose described.

2. In a box-nailing machine, box-supports hinged to swing downward springs to keep said supports normally in their elevated position and spring-catches on the hammer mechanism adapted to grasp lugs on the supports and swing said supports downward to let the box fall, as and for the purpose described.

3. In a device of the character described, a plunger-rod, a guide-box, in which said plunger-rod is adapted to slide, a feed-plunger composed of a hub secured on the plunger-rod, arms removably secured in sockets of the hub and corner-plates removably secured to the arms, in combination with gage-plates between the corner-plates removably secured to the guide-box by suitable arms, as and for the purpose described.

4. In a machine of the character described, a nail-feed consisting of a tube having an enlarged mouth, a block secured in said mouth, a spring-plate secured on the block and having two arms extending in the path of the nails in the tube, in combination with a hammer having a tapering shank to press the arms apart and allow the nails to fall on the block, as and for the purpose described.

5. In a device of the character described a plunger-rod, a guide-box in which said plunger-rod is adapted to slide a feed-plunger composed of a hub secured on the plunger-rod, arms removably secured in sockets of the hub, and corner-plates removably secured on the arms having spring-pressed pawls on their ends, in combination with gage-plates between the corner-plates removably secured to removable arms of the guide-box as and for the purpose described.

6. In a box-making machine, a reciprocating feed-plunger, a lever pivoted to the frame of the machine, a bolt projecting from the feed-plunger and sliding in a slot of the lever, a gear-wheel journaled in the frame, a crank-pin on the gear-wheel sliding in a slot of the lever, a disk having an indentation on its periphery secured to the gear-wheel, a spring-pressed dog pivoted to the frame having a nose to engage the indentation of the disk and a mutilated gear-wheel secured on the drive-shaft of the machine meshing with the gear-wheel, said mutilated gear-wheel having a blank in such a position as to disengage the gear-wheel when the dog engages the detent, as and for the purpose described.

7. In a device of the character described, a plunger having adjustable plates, a guide-box for the plunger, guides in which said box slides, a lug on the side of the box, a worm-screw threaded therein, having means for actuating to adjust the position of the box and detachable feed-boxes between which the plunger slides, as and for the purpose described.

8. In an automatic box-making machine, a frame adapted to support the operative parts of said machine; a set of gage-plates against which suitable shooks are fed, feed-boxes for supporting said shooks, a plunger composed of angle-plates having feed-dogs pivoted thereto, a slide-bar guided in a suitable box and to which said plunger is secured mechanism for actuating the slide-bar to cause the plunger to feed the shooks, which are to compose the sides of the box forward into a suitable frame, a plunger 45, mechanism for actuating said plunger, in unison with the first-named plunger a hopper from which nails are fed, parallel rails caused to travel in close proximity thereto whereby the nails are conveyed from said hopper in a vertical position, spreader-rolls for increasing the distance between the rails, in order that the nails may drop therefrom, chutes having mouths so formed as to receive the nails when dropping from the rails, said chutes terminating in enlargements having spring-forks arranged therein so as to place the nails in position for driving, hammers for forcing nails into shooks hammer-plates to which said hammers are secured, slide-bars carrying the hammer-plates, mechanism for imparting a reciprocating motion to said slide-bars and means for conveying the completed box from the machine, as and for the purpose described.

9. In an automatic box-making machine, a frame adapted to support the operative parts of said machine, a set of gage-plates against which suitable shooks are fed, feed-boxes for supporting said shooks a plunger composed of angle-plates having feed-dogs pivoted thereto, a slide-bar guided in a suitable box and to which said plunger is secured, mechanism for actuating the slide-bar to cause the plunger to feed the shooks which are to compose the sides of the box, forward into a suitable frame, a plunger 45, mechanism for actuating said plunger in unison with the first-named plunger, a hopper from which said nails are fed, parallel rails caused to travel in close proximity thereto, whereby the nails are conveyed from said hopper in a vertical position, spreader-rolls for increasing the distance between the rails in order that the nails may drop therefrom chutes having mouths so formed and placed as to receive the nails when dropping from said rails, said chutes terminating in enlargements having spring-forks arranged therein, so as to place the nails in position for driving, hammers for forcing said nails into shooks, hammer-plates to which said hammers are secured, slide-bars carrying the hammer-plates, housings in which said slide-bars are guided, rolls journaled to the sides of the slide-bars, eccentrics adapted to revolve in contact with said rolls for imparting reciprocation to said slide-bars, a series of beveled gears and connecting-shafts for causing the several eccentrics to revolve in unison and means connected to the hammer mechanism for causing the completed box to be conveyed from the machine, as and for the purpose described.

10. In an automatic box-nailing machine, a frame adapted to support the operative parts of said machine, a set of gage-plates against which suitable shooks are fed, feed-boxes for supplying said shooks, said boxes being adapted to be attached to and removed from the machine, push-bars guided in suitable slots in said boxes, weights connected to said push-bars by means of cords passing over suitable pulleys, the slide-bar 32, supported and guided in the box 4, a hub 34 secured upon the inner end of said slide-bar, angle-plates 36 adjustably attached to said hub, feed-dogs 37 pivoted to said angle-plates, a suitable hopper for holding the nails to be fed, rails adapted to travel beneath openings in the bottom of the hopper, said rails being at a distance from each other sufficiently to permit the passage of the nails therebetween but to prevent the passage of the heads of said nails, spreader-rolls for increasing the distance between the rails sufficiently to permit the passage of the heads of said nails, chutes having their mouths so arranged as to receive the nails when dropped from the said rails, said chutes terminating in enlargements at their lower ends, spring-forks arranged within said enlargements, the prongs of which are normally closed so as to retain the bottom nail in each of said chutes, the hammers 63 having enlargements adapted to spread the prongs of the forks to permit the bottom nail in each chute to assume a horizontal position, and means for operating said hammers, substantially as described.

In testimony whereof I have hereunto affixed my signature in the presence of two subscribing witnesses.

WILLIAM T. McRAE.

Witnesses:
S. S. WILLIAMSON,
ALLISON W. McCURDY.